Patented Feb. 21, 1950

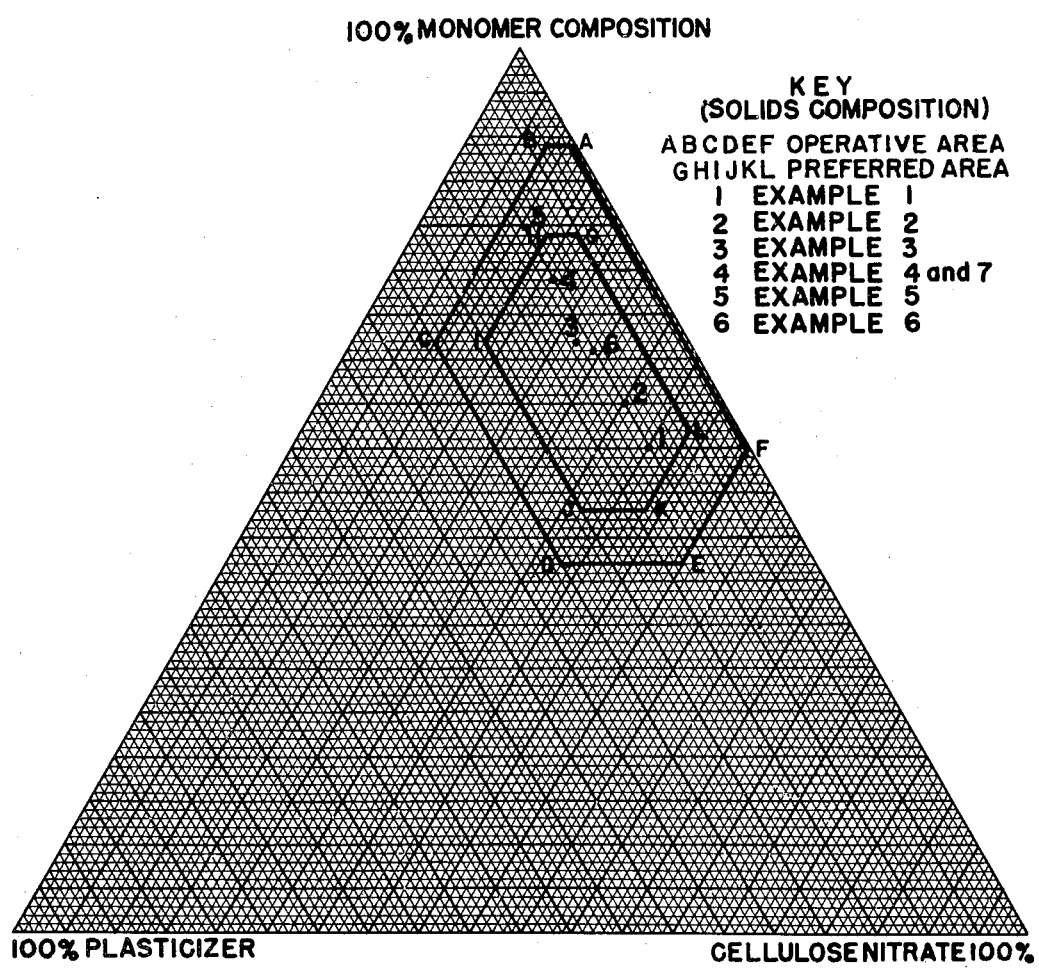

2,498,091

UNITED STATES PATENT OFFICE 2,498,091

CELLULOSE NITRATE COATING COMPOSITIONS

Walter K. Moffett, Flint, Mich., assignor to E. I. du Pont de Nemours & Company, Wilmington, Del., a corporation of Delaware Application June 14, 1947, Serial No. 754,727

11 Claims. (Cl. 260—17)

This invention relates to improved high solids coating compositions and, more particularly, to high solids coating compositions formulated with low viscosity cellulose nitrate and a polymerizable bifunctional monomer composition to yield useful finishes for metallic and non-metallic substrata.

Heretofore, finishes from high solids lacquers and enamels formulated with low viscosity cellulose nitrate have lacked the desired combination of toughness, mar-proofness, ease of rubbing, good cold crack resistance and good outdoor durability. Another unfavorable feature of commercial high solids, low viscosity cellulose nitrate finishes is poor resistance to solvent attack. Heretofore the plasticizing and resinous modifiers for the cellulose nitrate in the lacquer have been either non-polymerizable materials, polymers wherein polymerization is substantially complete before admixing with the cellulose nitrate, or polymerizable monofunctional monomers rather than bifunctional monomers which polymerize readily to an insoluble state.

These shortcomings limit the use of the previous high solids, low viscosity cellulose nitrate coating compositions to applications where the finish is normally subject to a limited range of temperature variation and where it will not be subjected to marring, scratching, or solvent attack.

This invention has an object the provision of coating compositions which contain exceptionally high percentages of film-forming materials at normal spraying consistency.

Another object is the provision of high solids, low viscosity cellulose nitrate coating compositions which yield finishes that are unaffected when subjected to wide temperature variations, and particularly to low temperatures.

A further object is the provision of high solids, low viscosity cellulose nitrate coating compositions which yield finishes having high resistance to attack by solvents in common household use.

A still further object is the provision of high solids, low viscosity cellulose nitrate coating compositions which yield finishes that are resistant to scratching and other types of marring.

Still another object is the provision of a lacquer finish which is print-free and ready for further finishing operations without passing through the "green stage" characteristic of orthodox finishes, thereby permitting economical acceleration of the finishing operations.

Other objects will be apparent as the description proceeds.

These objects are accomplished by combining low viscosity cellulose nitrate with polymerizable bifunctional glycol methacrylate monomer compositions and plasticizing modifiers.

The polymerizable bifunctional glycol methacrylate monomer compositions may be prepared by the esterification of methacrylic acid with a glycol or a mixture of glycols, or by mixing together the preformed esters of methacrylic acid and a glycol or a mixture of glycols. The copending application of Anderson and Ramler, Serial No. 671,395, filed May 21, 1946, fully describes the production of monomer compositions by the esterification of methacrylic acid with a mixture of glycols.

In the drawing, the single figure is a triangular graph showing the operative and preferred ranges (based on solids content) of the three ingredients. The area delineated by points ABCDEF shows that the low viscosity cellulose nitrate may range from approximately 8% to 45%, the polymerizable bifunctional methacrylate monomer composition from approximately 42% to 89%, and the plasticizing modifiers from 0.5% to 25%. The points GHIJKL delineate applicant's preferred ranges; i. e., the low viscosity cellulose nitrate from approximately 13% to 38%, the polymerizable bifunctional methacrylate monomer composition from approximately 48% to 79%, and the plasticizing modifiers from 5% to 20%.

The following examples are illustrative of the preferred embodiments of my invention, the ingredients of each composition being shown as percent by weight:

EXAMPLE 1

*Clear lacquer*

| | Per cent |
|---|---|
| Cellulose nitrate (18–23 centipoises) | 15.7 |
| Ethyl alcohol (denatured) | 9.7 |
| Monomer composition A | 24.8 |
| Alkyd resin solution A | 7.5 |
| Benzoyl peroxide | 0.1 |
| Cobalt nitrate hexahydrate | 0.1 |
| Methyl ethyl ketone | 42.1 |
| | 100.0 |

The coating composition of this example contains 45% solids at spraying viscosity shown as follows:

| | Per cent |
|---|---|
| Cellulose nitrate | 35 |
| Monomer composition A | 55 |
| Alkyd resin A | 10 |
| | 100 |

Monomer composition A is a mixture of dimethacrylate esters of polyethylene glycol 200, the latter being a mixture of various glycols, which mixture has a weighted average molecular weight of 200±15; i. e., between 185 and 215. An analysis of a typical mixture is as follows:

| Weight Per Cent | Material | Molecular Weight | Average Molecular Weight |
|---|---|---|---|
| 2.78 | Monoethylene glycol | 62 | |
| 5.6 | Diethylene glycol | 106 | |
| 18.47 | Triethylene glycol | 150 | |
| 18.1 | Tetraethylene glycol | 194 | 205.5 |
| 12.25 | Pentaethylene glycol | 238 | |
| 4.6 | Hexaethylene glycol | 282 | |

Alkyd resin solution A is a castor oil modified glyceryl phthalate of 55% oil length, cut to 60% solids in a mixture of 90 parts of high solvency petroleum lacquer diluent and 10 parts of butyl alcohol.

EXAMPLE 2

*Clear lacquer*

| | Per cent |
|---|---|
| Cellulose nitrate (18–23 centipoises) | 13.0 |
| Eethyl alcohol (denatured) | 7.0 |
| Monomer composition A | 26.0 |
| Alkyd resin solution B | 8.2 |
| Anhydrous isopropyl alcohol | 4.0 |
| Methyl ethyl ketone | 15.0 |
| Butyl acetate | 5.0 |
| Acetone | 17.0 |
| Toluene | 4.3 |
| Cobalt nitrate hexahydrate | 0.3 |
| Benzoyl peroxide | 0.2 |
| | 100.0 |

Alkyd resin solution B is a linseed oil modified glycerol phthalate of 53% oil length, cut to 55% solids in high solvency petroleum naphtha.

EXAMPLE 3

*Clear lacquer*

| | Per cent |
|---|---|
| Cellulose nitrate (18–23 centipoises) | 11.1 |
| Ethyl alcohol (denatured) | 7.0 |
| Monomer composition A | 33.3 |
| Alkyd resin solution A | 9.3 |
| Methyl ethyl ketone | 15.1 |
| Ethyl acetate | 7.0 |
| Butyl acetate | 7.0 |
| Anhydrous isopropyl alcohol | 10.0 |
| Cobalt nitrate | 0.1 |
| Benzoyl peroxide | 0.1 |
| | 100.0 |

EXAMPLE 4

*Clear lacquer*

| | Per cent |
|---|---|
| Cellulose nitrate (18–23 centipoises) | 8.7 |
| Ethyl alcohol (denatured) | 4.7 |
| Monomer composition B | 40.8 |
| Alkyd resin solution C | 7.9 |
| Butyl acetate | 2.0 |
| Methyl ethyl ketone | 15.1 |
| Methyl isobutyl ketone | 4.0 |
| Acetone | 10.0 |
| Toluene | 6.3 |
| Cobalt nitrate hexahydrate | 0.3 |
| Benzoyl peroxide | 0.2 |
| | 100.0 |

Monomer composition B is a mixture of equal parts of the monomeric dimethacrylate esters of polyethylene glycol 200 and the monomeric dimethacrylate ester of diethylene glycol, the weighted average molecular weight of the glycols being 153.

Alkyd resin solution C is a cottonseed oil modified glyceryl phthalate resin of 50% oil length, cut to 70% solids in toluene.

EXAMPLE 5

*Clear lacquer*

| | Per cent |
|---|---|
| Cellulose nitrate (18–23 centipoises) | 7.0 |
| Ethyl alcohol (denatured) | 3.8 |
| Monomer composition C | 56.0 |
| Alkyd resin solution D | 11.8 |
| Butyl acetate | 2.0 |
| Amyl acetate | 1.7 |
| Methyl ethyl ketone | 7.0 |
| Methyl isobutyl ketone | 2.1 |
| Toluene | 8.2 |
| Cobalt nitrate | 0.2 |
| Benzoyl peroxide | 0.2 |
| | 100.0 |

Monomer composition C is a mixture of equal parts of the monomeric dimethacrylate esters of polyethylene glycol 400 and the monomeric dimethacrylate ester of diethylene glycol, the weighted average molecular weight of the glycols being 253.

Alkyd resin solution D is a hydrogenated castor oil modified glyceryl phthalate resin of 45% oil length, cut to 60% solids in toluene.

EXAMPLE 6

*Clear lacquer*

| | Per cent |
|---|---|
| Cellulose nitrate (18–23 centipoises) | 12.0 |
| Ethyl alcohol (denatured) | 6.5 |
| Monomer composition A | 33.0 |
| Alkyd resin solution E | 7.7 |
| Anhydrous isopropyl alcohol | 3.0 |
| Methyl ethyl ketone | 15.0 |
| Acetone | 15.0 |
| Butyl acetate | 4.0 |
| Toluene | 3.5 |
| Cobalt nitrate hexahydrate | 0.2 |
| Benzoyl peroxide | 0.1 |
| | 100.0 |

Alkyd resin solution E is a coconut oil acid modified ethylene glycol-pentaerythritol-phthalic anhydride alkyd resin cut to 65% solids in toluene. The solids of the said resin have the essential components in the following proportions:

| | Per cent |
|---|---|
| Coconut oil acids | 46.3 |
| Ethylene glycol | 7.3 |
| Pentaerythritol | 16.0 |
| Phthalic anhydride | 30.4 |
| | 100.0 |

The compositions of Examples 2, 3, 4, 5, and 6 are of the same general type as that of Example 1, but have a lower content of cellulose nitrate and a higher proportion of polymerizable monomeric material. They contain 40-70% solids and exhibit a consistency normal for spray application without further reduction.

EXAMPLE 7

Pigmented lacquer

| | Per cent |
|---|---|
| Cellulose nitrate (18-23 centipoises) | 7.5 |
| Ethyl alcohol (denatured) | 4.1 |
| Butyl acetate | 9.0 |
| Titanium dioxide | 9.5 |
| Monomer composition A | 34.0 |
| Butyl alcohol | 2.0 |
| Methyl ethel ketone | 20.0 |
| Toluene | 6.9 |
| Alkyd resin solution F | 6.5 |
| Cobalt nitrate hexahydrate | 0.3 |
| Benzoyl peroxide | 0.2 |
| | 100.0 |

Alkyd resin solution F is a coconut oil modified glyceryl phthalate resin of 50% oil length, cut to 70% solids in toluene.

This example represents a pigmented modification and is sprayable at 55% solids content.

Although the cellulose nitrate in the above examples has a viscosity of 18-23 centipoises, as determined in accordance with the procedure outlined in A. S. T. M. Specification D-301-33 Formula A, and is the usually preferred type, cellulose nitrate having a viscosity within the range of 10-40 centipoises is operative within the scope of this invention.

Any polymerizable bifunctional glycol methacrylate monomer composition may be used in the practice of this invention, such as mixtures of preformed glycol esters of methacrylic acid or glycol esters derived from the methacrylic acid esterification of a glycol or mixtures of glycols having the empirical formula $$HO(CH_2-HC_2-O)_nH$$

wherein $n$ is an integer, usually varying from 1 to 20 for mixtures, and the molecular weight of the glycol in the case of a single species or the weighted average molecular weight of the glycols in the case of a mixture is in the range of about 100 to 300. The value of $n$ may exceed 20 with the provision that the preferred limitation on weighted average molecular weight in the range of about 100 to 300 for the glycol mixture is maintained. Methacrylate monomers derived from glycol mixtures with a weighted average molecular weight in excess of 300 yield polymers lacking in strength and toughness, thereby defeating an object of this invention. Mixtures of glycols with a weighted average molecular weight of approximately 100 yield brittle methacrylate polymers which alone are considered as of little commercial value because of brittleness, but within the scope of this invention they are useful in combination with low viscosity cellulose nitrate and plasticizing alkyd resins.

Applicant's preferred polymerizable bifunctional methacrylate monomer composition is the mixture of dimethacrylate esters of polyethylene glycol 200, the latter being a mixture of various glycols, which mixture has a weighted average molecular weight of 200±15.

Conventional lacquer plasticizers may be used in the practice of the present invention within the limitation of compatibility with the combination of cellulose nitrate and methacrylate. Likewise, orthodox lacquer plasticizers may be used in combination with alkyd resins. However, applicant prefers the oil modified alkyd resins as the plasticizing ingredient of the composition because they may be used in larger quantities before the plasticizing effect is undesirably high for the methacrylate monomer.

Plasticizing oil modified alkyd resins other than those shown in the examples may be used. Different oil lengths and different modifying oils and oil acids of the non-drying, semi-drying, and drying types, such as soya bean or perilla, in addition to those shown in the examples, as well as different alkyd resins, may be used. However, since the main purpose of the alkyd is its plasticizing action, the long oil length, soft alkyds are preferred.

The volatile constituents of these high solids formulations are orthodox lacquer solvents and diluents. However, it is preferred to use a major proportion of solvents and diluents having a faster evaporation rate than normal butyl acetate to avoid solvent or diluent entrapment in the polymerizing coating. Aromatic hydrocarbons are preferred to aliphatic hydrocarbons.

In formulating cellulose nitrate compositions, it is within the scope of this invention to use 12.5-80 parts by weight of polymerizable methacrylate monomer composition to 10 parts by weight of cellulose nitrate. Applicant prefers to use 15-50 parts of monomer composition to 10 parts of cellulose nitrate.

Finishes containing 0.5% to 25% plasticizer, based on the weight of the vehicle solids, accomplish the objects of this invention. It is preferred, however, to limit the plasticizer content to the approximate range of about 5% to about 20%.

By comparison, previous cellulose nitrate compositions formulated for high solids application rely on a high ratio of plasticizing alkyd resin to cellulose nitrate, and the alkyd is generally a short oil length, drying oil modified resin. Unrubbed finishes range from about 15 to 50 parts of alkyd for 10 parts of cellulose nitrate by weight. These finishes depend on oxidation of the modifying oil for the development of adequate hardness, and lack the desirable features contributed by the compositions of this invention.

Prior rubbed finishes vary widely in composition depending on the type of application and the quality required. In general, these are formulated with non-drying oil modified alkyds, hard resins, and orthodox lacquer plasticizers in combination with cellulose nitrate, the resin-plasticizer mixture ranging from about 5 to 15 parts for 10 parts of cellulose nitrate. These compositions do not yield high solids at spraying consistency because of the high content of cellulose nitrate which is the main contributor to the viscosity of the product.

Polymerizable monomeric methacrylates generally contain inhibitors which prevent premature polymerization. Although polymerization of the coating compositions of this invention will proceed when subjected to heat, light, or ozone, it is generally preferred to incorporate chemical accelerators, such as benzoyl peroxide, lauroyl peroxide, tertiary butyl perbenzoate, α,α'-azo-bis-α,γ-dimethylvaleronitrile, α,α'-azo-diisobutyronitrile, or benzoin in the final composition in order that polymerization may proceed at a rate suitable to the type of application. The use of inorganic salts of cobalt to provide a rapid polymerization cycle is described in Marks U. S. application Serial No. 688,977, filed October 25, 1946.

Pigmented enamels, such as that shown in Example 7, may be prepared by first dispersing the pigment in a cellulose nitrate vehicle, or in the plasticizing resin vehicle, by methods known to the art. In addition to color effects, extender pigments may be used for flatting a clear vehicle. It is preferred that the pigments and flatting agents be of such chemical character that they do not unduly affect the polymerization.

Clear or pigmented lacquers of this invention, containing exceptionally high solids (about 40% to 70%), may be sprayed. One coat application yields a film thickness in the range of approximately 1.5 to 3.0 mils when subjected to a temperature range from 65° F. to 270° F., preferably 120° F. to 215° F., the film build per coat depending on the solids content of the lacquer, the rate of solvent loss between the spray gun and the work, and the rate of polymerization of the wet finish. Higher film builds may be obtained by multiple coat application, but the second coat must be applied before the monomeric material of the first coat has been substantially polymerized in order to obtain adequate adhesion. However, two coat applications would be abnormal inasmuch as the film thickness obtained by one coat application is generally considered adequate. Three or four coats are required to obtain a comparable film thickness with previous low viscosity cellulose nitrate lacquers.

Once the monomeric methacrylate composition has polymerized, the film is no longer attacked by the volatile constituents of the parent lacquer.

Heretofore, lacquers formulated with 18-23 centipoise viscosity cellulose nitrate were generally characterized by inferior cold cracking resistance, but the present finishes overcome this due to the resulting polymer.

The compositions of this invention may be applied to wooden objects by spraying, without special spray equipment, and yield useful and decorative, tough, and mar resistant finishes of exceptionally high film build, e. g., 2 mils, in one coat. Metal objects may be similarly finished by application of these finishes over conventional undercoat systems.

These finishes, when aged for two weeks at 120° F. and then subjected to cyclic temperature variations of −10° F. to 120° F., show an extremely high resistance to checking or cold cracking without sacrificing the other outstanding properties discussed herein. Hitherto it was not possible to achieve this high resistance to checking or cold cracking except at a sacrifice in other desirable properties.

These finishes also possess outstanding print resistance and hardness upon the completion of the polymerization cycle, and do so without passing through the conventional "green stage," thus eliminating delays in finishing operations.

The finishes of this invention resist attack by alcohol, nail polish removers, lacquer thinners, and similar liquids that attack previous lacquer finishes. This property, in conjunction with mar and scratch resistance, makes these finishes particularly useful for protective and decorative applications on tables, desks, trays, and similar objects where such abuses are common. These resistant finishes show a further improvement over previous lacquers in that the finished objects may be subjected to outdoor exposure and wide variations in temperature without rapid deterioration of the finish. In addition, these coating compositions are characterized by unusually high solids at spraying viscosity which results in economy of application.

It is apparent that many widely different embodiments of this invention can be made without departing from the spirit and scope thereof; and, therefore, it is not intended to be limited except as indicated in the appended claims.

I claim:

1. A sprayable, high solids coating composition in which the solids content comprises 8-45% of 10-40 centipoise cellulose nitrate, 42-89% of polymerizable dimethacrylate esters of a mixture of glycols each having the formula $$HO(CH_2-CH_2-O)_nH$$

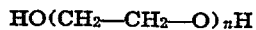

wherein $n$ is an integer, the weighted average molecular weight of the glycol mixture being between 100 and 300, and 0.5-25% of a compatible plasticizer.

2. The coating composition of claim 1, in which the cellulose nitrate has a viscosity of 18-23 centipoises.

3. The coating composition of claim 1, in which the weighted average molecular weight of the glycol mixture is between 185 and 215.

4. The coating composition of claim 1, in which there are 10 parts of cellulose nitrate to 12.5-80 parts of the dimethacrylate esters of a mixture of glycols.

5. The coating composition of claim 1, in which the plasticizer is an oil modified alkyd resin.

6. The coating composition of claim 1, in which the plasticizer is a 55% castor oil modified glyceryl phthalate resin.

7. A sprayable, high solids coating composition in which the solids content comprises 13-38% of 10-40 centipoise cellulose nitrate, 48-79% of polymerizable dimethocrylate esters of a mixture of glycols each having the formula $$HO(CH_2-CH_2-O)_nH$$

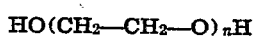

wherein $n$ is an integer, the weighted average molecular weight of the glycol mixture being between 100 and 300, and 5-20% of a compatible plasticizer.

8. A sprayable, high solids coating composition in which the solids content comprises 8-45% of 18-23 centipoise cellulose nitrate, 42-89% of polymerizable dimethacrylate esters of a mixture of glycols each having the formula $$HO(CH_2-CH_2-O)_nH$$

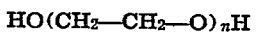

wherein $n$ is an integer, the weighted average molecular weight of the glycol mixture being between 100 and 300, 0.5-25% of a compatible plasticizer, and a pigment.

9. A sprayable, high solids coating composition in which the solids content comprises 8-45% of 18-23 centipoise cellulose nitrate, 42-89% of polymerizable dimethacrylate esters of a mixture of glycols each having the formula $$HO(CH_2-CH_2-O)_nH$$

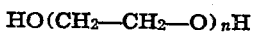

wherein $n$ is an integer, the weighted average molecular weight of the glycol mixture being between 100 and 300, 0.5-25% of a compatible plasticizer, and a polymerization accelerator.

10. A sprayable, high solids coating composition containing the following ingredients:

| | Per cent |
|---|---|
| Cellulose nitrate (18–23 centipoises) | 11.1 |
| Ethyl alcohol (denatured) | 7.0 |
| Dimethacrylate esters of polyethylene glycol 200 | 33.3 |
| 55% castor oil modified glyceryl phthalate solution (60% solids) | 9.3 |
| Methyl ethyl ketone | 15.1 |
| Ethyl acetate | 7.0 |
| Butyl acetate | 7.0 |
| Anhydrous isopropyl alcohol | 10.0 |
| Cobalt nitrate | 0.1 |
| Benzoyl peroxide | 0.1 |
| | 100.0 |

11. A sprayable, high solids coating composition containing the following ingredients:

| | Per cent |
|---|---|
| Cellulose nitrate (18–23 centipoises) | 15.7 |
| Ethyl alcohol (denatured) | 9.7 |
| Dimethacrylate esters of polyethylene glycol 200 | 24.8 |
| 55% castor oil modified glyceryl phthalate solution (60% solids) | 7.5 |
| Cobalt nitrate hexahydrate | 0.1 |
| Benzoyl peroxide | 0.1 |
| Methyl ethyl ketone | 42.1 |
| | 100.0 |

WALTER K. MOFFETT.

REFERENCES CITED

The following references are of record in the file of this patent:

UNITED STATES PATENTS

| Number | Name | Date |
|---|---|---|
| 1,783,168 | Bruson | Nov. 25, 1930 |
| 2,064,802 | Edgar | Dec. 15, 1936 |
| 2,155,590 | Garvey | Apr. 25, 1939 |
| 2,156,144 | Bruson | Apr. 25, 1939 |
| 2,160,532 | Barrett et al. | May 30, 1939 |
| 2,379,246 | Muskat | June 26, 1945 |
| 2,402,942 | Bludworth | July 2, 1946 |
| 2,420,720 | Pechukas et al. | May 20, 1947 |

Certificate of Correction

Patent No. 2,498,091                          February 21, 1950

WALTER K. MOFFETT

It is hereby certified that error appears in the printed specification of the above numbered patent requiring correction as follows:

Column 8, line 43, for "dimethocrylate" read *dimethacrylate*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*

Certificate of Correction

Patent No. 2,498,091                                                      February 21, 1950

WALTER K. MOFFETT

It is hereby certified that errors appear in the printed specification of the above numbered patent requiring correction as follows:

Column 5, line 45, for that portion of the formula reading "HC$_3$" read $CH_3$; column 8, line 43, for "dimethocrylate" read *dimethacrylate*;

and that the said Letters Patent should be read with these corrections therein that the same may conform to the record of the case in the Patent Office.

This certificate supersedes Certificate of Correction issued May 16, 1950.

Signed and sealed this 25th day of July, A. D. 1950.

[SEAL]

THOMAS F. MURPHY,
*Assistant Commissioner of Patents.*